(12) United States Patent
Kukehalli Subramanya et al.

(10) Patent No.: US 10,643,149 B2
(45) Date of Patent: May 5, 2020

(54) WHITELIST CONSTRUCTION

(71) Applicant: ORACLE INTERNATIONAL CORPORATION, Redwood Shores, CA (US)

(72) Inventors: Ramya Kukehalli Subramanya, Redmond, WA (US); Madhu Martin, Bangalore (IN); Venkatesh Uppalapati, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 238 days.

(21) Appl. No.: 15/249,232

(22) Filed: Aug. 26, 2016

(65) Prior Publication Data
US 2017/0118167 A1    Apr. 27, 2017

Related U.S. Application Data

(60) Provisional application No. 62/245,185, filed on Oct. 22, 2015.

(51) Int. Cl.
G06N 20/00    (2019.01)
H04L 29/12    (2006.01)
(Continued)

(52) U.S. Cl.
CPC ........... *G06N 20/00* (2019.01); *G06F 16/958* (2019.01); *H04L 41/0806* (2013.01);
(Continued)

(58) Field of Classification Search
CPC . H04L 61/2046; H04L 41/12; H04L 41/5054; H04L 61/305; H04L 63/0815;
(Continued)

(56) References Cited

U.S. PATENT DOCUMENTS 8,510,411 B2    8/2013  Coulson et al.
8,775,517 B1 *  7/2014  Goldman .............. G06Q 50/01
                                                    709/204
(Continued)

OTHER PUBLICATIONS

"Identity management service for Cloud Foundry" [online] retrieved on Sep. 1, 2015, 11 pages. URL http://bosh.cloudfoundry.org/jobs/uaa?source=github.com/cloudfoundry/cf-release&version=210.
(Continued)

*Primary Examiner* — Benjamin M Thieu
(74) *Attorney, Agent, or Firm* — Kilpatrick Townsend & Stockton LLP

(57) ABSTRACT

Techniques are provided for of constructing a whitelist of redirection uniform resource locators (URLs). A method can include receiving, by a computing system executing an access manager application, a request to log out a user from an application executing on a device; determining, by the access manager application, a redirection address for the application; validating, by the access manager application, the redirection address; and based on the validation, causing, by the access manager application, the application to perform one of redirecting the user to the redirection address and determining addition of the redirection address to a list of valid redirection addresses.

19 Claims, 11 Drawing Sheets

(51) Int. Cl.
  *H04L 29/06* (2006.01)
  *H04L 12/24* (2006.01)
  *G06F 16/958* (2019.01)
  *H04L 12/26* (2006.01)

(52) U.S. Cl.
  CPC ........ *H04L 43/0876* (2013.01); *H04L 61/305* (2013.01); *H04L 63/0815* (2013.01); *H04L 63/101* (2013.01); *H04L 63/20* (2013.01)

(58) Field of Classification Search
  CPC ....... H04L 63/101; H04L 63/20; H04L 67/02; H04L 67/22; G06F 17/3089; G06N 99/005
  See application file for complete search history.

(56) References Cited

U.S. PATENT DOCUMENTS

| | | | |
|---|---|---|---|
| 8,862,699 B2 | 10/2014 | Bhatawdekar et al. | |
| 8,863,232 B1 | 10/2014 | Tidd | |
| 8,903,986 B1* | 12/2014 | Newstadt | H04L 63/1425 709/217 |
| 9,112,897 B2* | 8/2015 | Teo | G06F 21/566 |
| 2002/0029269 A1* | 3/2002 | McCarty | H04L 63/0815 709/225 |
| 2002/0165971 A1* | 11/2002 | Baron | H04L 63/0281 709/228 |
| 2003/0229783 A1* | 12/2003 | Hardt | G06F 21/33 713/155 |
| 2004/0142295 A1* | 7/2004 | Holden | B63J 2/14 432/227 |
| 2004/0153992 A1* | 8/2004 | Molina-Moreno | G06F 8/35 717/105 |
| 2005/0235044 A1* | 10/2005 | Tazuma | H04L 29/12066 709/217 |
| 2007/0174423 A1* | 7/2007 | Yoshida | H04L 67/2814 709/217 |
| 2007/0261112 A1* | 11/2007 | Todd | G06F 21/577 726/11 |
| 2008/0071619 A1* | 3/2008 | Charlton | G06Q 20/10 705/14.16 |
| 2008/0301116 A1* | 12/2008 | Wang | G06F 17/30864 |
| 2010/0100958 A1* | 4/2010 | Jeremiah | G06F 21/36 726/22 |
| 2010/0223355 A1 | 9/2010 | Yang et al. | |
| 2012/0226742 A1* | 9/2012 | Momchilov | G06F 3/1454 709/203 |
| 2012/0324365 A1* | 12/2012 | Momchilov | G06F 3/14 715/738 |
| 2013/0246943 A1* | 9/2013 | Goodman | H04L 67/02 715/760 |
| 2015/0188906 A1* | 7/2015 | Minov | H04L 63/0815 726/8 |
| 2016/0188356 A1* | 6/2016 | Ramasamy | G06F 9/45558 718/1 |

OTHER PUBLICATIONS

"NetIQ Documentation: NetIQ Access Manager 4.0 SP1 Identity Server Guide—Using the Intersite Transfer Service" [online] retrieved on Sep. 1, 2015, 9 pages. URL https://www.netiq.com/documentation/netiqaccessmanager4/identityserverhelp/data/bdqwiuh.html#bstbri6.

Gary L. Gilbert, "Preventing Un-validated Redirects on the Access Gateway Service using a Whitelist", dated Jul. 14, 2015, 9 pages. URL https://www.netiq.com/communities/cool-solutions/preventing-un-validated-redirects-access-gateway-service-using-whitelist/.

"URL Redirection to Untrusted Site ("Open Redirect")" [online] retrieved on Sep. 2, 2015, 8 pages. URL https://cwe.mitre.org/data/definitions/601.html.

"Administration Redirection URL Access" [online] retrieved on Sep. 2, 2015, 1 page. URL https://techcommunity.softwareag.com/pwiki/-/wiki/Main/Administering+Redirecton+URL+Access.

"External Authentication (Single Sign-On SSO)" [online] retrieved on Sep. 2, 2015, 8 pages. URL http://wiki.servicenow.com/title=External_Authentication_(Single_Sign-On_-_SSO)#gsc.tab=0.

"Logout and Single Logout (SLO)" [online] retrieved on Sep. 2, 2015, 5 pages. URL http://jasig.github.io/cas/development/installation/Logout-Single-Signout.html.

"Ping Access-Overview" [online] 6 pages. URL https://documentation.pingidentity.com/download/attachments/25140910/Overview.pdf?version=1&modificationDate=1405988623550.

"SAML Setup Guide", IBM Kenexa LMS, version 4.2, Release date: Aug. 14, [online] 15 pages. URL http://www-01.ibm.com/support/docview.wss?uid=swg270435048&aid=1.

* cited by examiner

WHITELIST CONSTRUCTION

CROSS-REFERENCE TO RELATED APPLICATION

This application is a non-provisional application of and claims the benefit and priority of U.S. Provisional Application No. 62/245,185, filed on Oct. 22, 2015 titled "WHITE-LISTING MANAGEMENT IN ACCESS MANAGER," which is herein incorporated by reference in its entirety for all purposes.

BACKGROUND

The present disclosure generally relates to whitelisting management in an access manager. In particular, the disclosure relates to an application that is configured to control access to resources, such as Oracle® Access Manager (OAM), that is capable of constructing a whitelist of redirection uniform resource locators (URLs).

An access manager, such an OAM, can provide access management for applications, data and web services. Further, an access manager can be used to provide centralized single sign-on and single sign-out for applications, servers, and data.

An access manager can provide a single sign-out in which an application can invoke a logout URL and a single sign-on (SSO) session can be terminated. As part of the sign-out, the application can also determine the web page that the user should be redirected to after the logout is performed. The web page that the user should be redirected to after the logout may be identified using a redirection URL. The application can append the redirection URL as a value of a parameter, such as "end URL," to the logout URL. Once the access manager performs the logout, the user is redirected to this "end URL". That is, the user can be redirected to a location pointed to by the end URL. However, there is a security concern with redirecting the user to an end URL when the authenticity of that URL has not been validated.

In some instances, an administrator of the access manager can manually maintain a list of end URLs that are approved for redirection after logging out of a single sign on session. That is, an administrator can manually maintain a list (referred to as a "whitelist") of approved end URLs. Any changes or updates to this list have to be manually managed by the administrator. Also, the access manager administrator needs to be aware of an application's URL nuances or particular aspects of the URL. Therefore, this can be burdensome and can result in errors, such as, administrator errors. Further, the whitelist may not always be up-to-date and may be incomplete.

SUMMARY

Techniques are provided for performing whitelisting management by an access manager application. The access manager application can also be known as an access manager program or an access manager. Specifically, in accordance with an exemplary embodiment, an access manager can include a whitelisting capability. The access manager can perform authentication and can create and maintain a list of end uniform resource locators (end URLs) that are validated and to which a user can be safely be redirected.

Instead of requiring, for example, an administrator to update a whitelist (e.g., add any new end URLs or delete expired end URLs), an access manager can construct and maintain a whitelist. Therefore, an exemplary embodiment is easier to maintain and less prone to errors.

According to some embodiments, the access manager can construct a whitelist by performing machine learning in order to add end URLs that are protected and that can be accessed. Further, the access manager can learn from a user's actions in order to construct the whitelist of end URLs.

In accordance with some embodiments, an access manager can utilize authentication, authorization events and a user's action to populate a whitelist.

In some embodiments, a method can include receiving, by a computing system executing an access manager application, a request to log out a user from an application executing on a device, determining, by the access manager application, a redirection address for the application; validating, by the access manager application, the redirection address, and based on the validation, causing, by the access manager application, the application to perform one of redirecting the user to the redirection address and determining whether to add the redirection address to a list of valid redirection addresses.

In some embodiments, the application redirects the user to the redirection address in response to the redirection address being on the list of valid redirection addresses.

In some embodiments, the list of valid redirection addresses includes one or more approved redirection addresses.

In some embodiments, the list of valid redirection addresses includes one of a machine-learned address based on learned previous activity and a user-based address that is based on a user activity.

In some embodiments, the determining the addition of the redirection address to the list of valid redirection addresses includes determining that the redirection address corresponds to a predetermined event, and in response to the determining that the redirection address corresponds to the predetermined event, adding the redirection address to the list of valid redirection addresses.

In some embodiments, the predetermined event includes one of application registration during which the application is registered with the access manager application, product integration during which one or more products are added to operate with the access manager application, and log-in page addition in which a new log-in page for the application is added.

In some embodiments, the determining the addition of the redirection address to the list of valid redirection addresses includes determining that the redirection address corresponds to a predetermined user action, and in response to the determining that the redirection address corresponds to the predetermined user action, adding the redirection address to the list of valid redirected addresses.

In some embodiments, the predetermined user action includes user confirmation of the redirection address.

In some embodiments, the list of valid redirection addresses includes at least one of a system-level list that applies to users of the access management system and a user-level list that applies to particular users of the access management system.

In some embodiments, the system-level list includes end URLs that are applicable to all access management system users.

In some embodiments, the user-level list includes one or more end URLs that are applicable to a particular access management system user.

In some embodiments, the redirection address is a Uniform Resource Locator (URL).

In some embodiments, the redirection address includes a logout Uniform Resource Locator (URL) and an end URL.

Some embodiments are directed to a non-transitory computer-readable storage medium storing a plurality of instructions executable by one or more processors to cause the one or more processors to perform operations, including receiving, by a computing system executing an access manager application, a request to log out a user from an application executing on a device, determining, by the access manager application, a redirection address for the application, validating, by the access manager application, the redirection address, and based on the validation, causing, by the access manager application, the application to perform one of redirecting the user to the redirection address, and determining addition of the redirection address to a list of valid redirection addresses.

Some embodiments are directed to system including a memory, and one or more processors coupled to the memory and configured to receive, by a computing system executing an access manager application, a request to log out a user from an application executing on a device, determine, by the access manager application, a redirection address from the application, determine, by the access manager application, validity of the redirection address, and based on the validation, cause, by the access manager application, the application to perform one of redirecting the user to the redirection address, and determining addition of the redirection address to a list of valid redirection addresses.

Other embodiments are directed to electronic devices, and computer readable media, and systems associated with methods described herein.

A better understanding of the nature and advantages of the embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 7 illustrates an example of a system-level whitelist, in accordance with an embodiment.

FIG. 8 illustrates an example of a user-level whitelist, in accordance with an embodiment.

DETAILED DESCRIPTION

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

In accordance with an exemplary embodiment, an access manager can construct a whitelist containing, for example, a list of validated uniform resource locators (URLs) to which a user is redirected to upon a logout. A URL that is added to the whitelist is a validated URL. Such URL's can be referred to as an end URL or a redirection URL. A redirection URL can include, for example, a logout URL and an end URL, as further discussed below.

An access manager (e.g., Oracle® Access Manager) is an application or program that can provide, for example, adaptive authentication, single sign-on, and authorization protection. Secure business transformations with mobile and social networking technologies, hybrid on premise and cloud application deployment, and hybrid access management deployment can be enabled.

In certain embodiments, the access manager can construct a whitelist of end URLs by performing machine learning in order to add end URLs that are protected and are capable of being accessed, to the whitelist. In another exemplary embodiment, the access manager can construct a whitelist of end URLs by learning from a user's actions in order to determine what end URL's should be added to a whitelist (also sometimes referred to what end URL should be whitelisted).

Since the access manager is capable of automatically creating and maintaining the whitelist of end URLs, the access manager administrator does not have to manually update the whitelist every time a new application is registered. Instead, the access manager can progressively learn which end URL's should be whitelisted. Therefore, an administrator or user does not have to manually determine which end URL's are approved for redirection.

Figure 1:
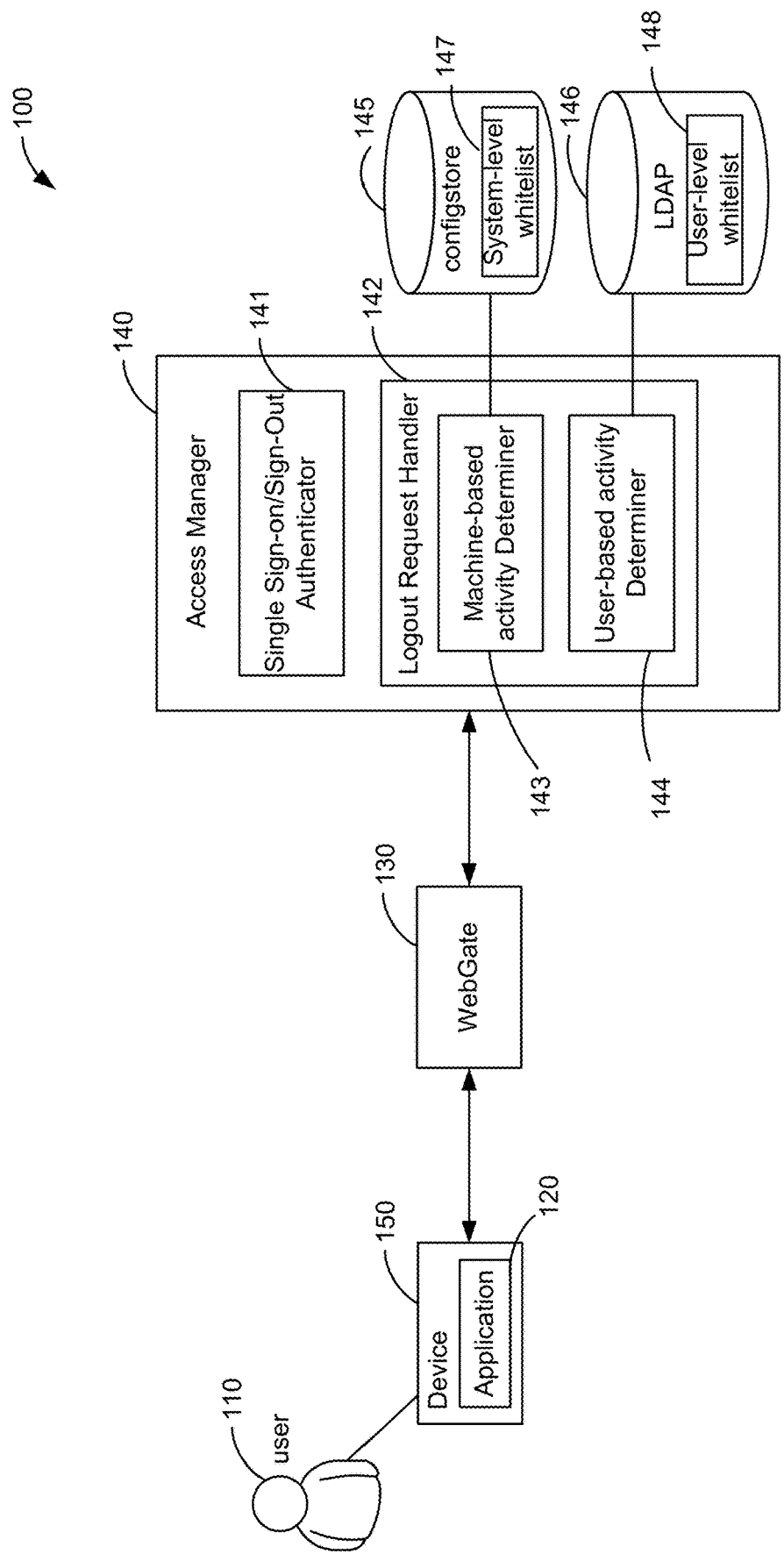
FIG. 1 illustrates a system for creating a whitelist, in accordance with an embodiment.

FIG. 1 illustrates a system for creating a whitelist of end URLs, in accordance with an embodiment. The system 100 can include a device 150 on which an application 120 is stored. The device 150 can be, for example, a mobile device. A user 110 can access the application 120 on the device 150. The system 100 further includes a web gate 130, an access manager 140, a storage 145 (e.g., a memory) and a storage 146 (e.g., a memory). Although these elements are described, the system 100 is not limited to these elements and the order and arrangement of the elements in the system 100 can be modified.

In certain embodiments, when a user 110 requests access to a resource, such as application 120, a web gate 130 can redirect the request to the access manager 140. Resources may include a file, a web page, a document, web content, a computing resource, or an application. For example, system 100 may include resources such as application 120 and/or content accessible through application 120.

An application 120 can include, for example, an expense report application, a finance application, a human resources application, a database application, etc., however, these are merely examples and are not intended to be restrictive. The application 120 can be an application that is a client of the access manager 140. A resource may be requested and accessed using an application. For example, an application may request access to a web page from a resource server based on a URL identifying a requested resource. Resources may be provided by one or more computing systems. While the application 120 is been shown as stored on device 150 in FIG. 1, this is not intended to be limiting. In alternative embodiments, the requested resources (e.g., application 120) may be stored on a device or location that is remote from device 150. In some embodiments, the requested resource may be stored in distributed networked system such as by a system of a cloud services provider.

Web gate 130 can be a web-server plug-in for the access manager 140 that can intercept and forward HTTP or URL requests to the access manager 140 for authentication and authorization. A web server, application server, or any third-party application can be protected by the web gate 130 that is registered with the access manager 140 as an agent. An agent, such as web gate 130, may protect access to a resource provided by a server. To enforce policies, the agent acts as a filter for Hypertext Transfer Protocol (HTTP) requests. In alternative embodiments, other programs or applications may be configured to intercept and forward requests to the access manager 140 for authentication and authorization.

In certain embodiments, the access manager 140 can be an Oracle® Access Manager (OAM) that provides an access management system that is configured to provide centralized authentication, authorization and auditing to enable single sign-on and secure access control across resources. The access manager 140 can enable administrators to define authentication and authorization policies, which may specify the resources that are to be protected by the access manager 140 and the manner of the protection. When a user 110 accesses the application 120 that is protected by the access manager 140, the access manager 140 can determine how the user 110 is to authenticated and authorized before the user is allowed to access or use the application 120.

In certain embodiments, the access manager 140 can implement a single sign-on and a single sign-out capability. In order to provide the single sign-on and a single sign-out or single logout function capability, the access manager 140 can include a single sign-on/sign-out authenticator 141. Single-sign on enables a user to access multiple applications protected by the access manager 140 using a single login. As part of the single-sign on process, the user may provide information (e.g., a user name and password) that is used by the access manager 140 to authenticate the user. Once successfully authenticated, the user can then access multiple applications protected by the access manager 140 without having to perform re-authentication for each individual application. The access manager 140 may manage access to one or more resources by implementing a single sign-on system.

During the authentication process, the user 110 can be requested to provide various credentials, such as a username and password. Upon successful authentication, the user may then have the ability to access one or more resources (e.g., applications). In certain embodiments, upon successful authentication, the user is provided an authentication token by the access manager 140. The authentication token is then used to enable the user to single sign-on to multiple applications.

In certain instances, after successful authentication, when the user requests access to a particular resource (e.g., an application), an authorization process may be performed by the access manager 140 to determine whether the user 110 is allowed to access that resource, such as application 120. The user may be allowed to access the requested resource only if authorized. If it is determined that the user 110 is authorized to access the resource (e.g., access the application 120), the user 110 may be provided an authorization token by the access manager 140. The token can be stored by the access manager 140 and the same token can be used to access multiple resources managed by the same access manager 140 to thereby provide a single sign-on functionality for the multiple resources.

A single sign-on session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. In certain embodiments, a resource may be identified by a uniform resource locator (URL) or other data indicating a source of the resource.

The user can then sign-off or log out from the single sign-on session. A single sign-out or single logout can exit a user from one or more applications accessed via the single-sign on. If an application initiates a logout, then the authentication token that was received from the access manager is invalidated and removed from the browser. The user is then logged out from the session and the associated applications.

As part of the sign-out, the user may be redirected to a location (e.g., a webpage) identified by a redirection URL or end URL. A redirection URL can be, for example, a combination of a logout URL and an end URL. However, these are merely examples of the URL's that can be included in the whitelist. The access manager 140 may store a list of end URLs (referred to as the whitelist) corresponding to the various applications. In certain embodiments, access manager 140 is configured to automatically create and maintain this whitelist of end URLs. In the example depicted in FIG. 1, processing related to the creation and maintenance of the whitelist of end URLs is performed by logout request handler 142. The whitelist of end URLs may be stored in a memory location accessible to the access manager 140. For instance, in the example in FIG. 1, the whitelist may be stored in storage 145 and/or storage 146. The storage 145 can be a configuration store (e.g., configstore) of the access manager 140 and the storage 146 can be a directory server (e.g. Lightweight Directory Access Protocol (LDAP) server) of the access manager 140. Although a separate storage is shown for the system-level whitelist and the user-level whitelist, the whitelists may be stored in a same storage.

A system-level whitelist 147 can be created according to machine learning, such as registration of new application and initiation of a login request. A system-level whitelist 147 can be applicable to all users of the system. The configstore 145 can store a system-level whitelist 147. A user-level whitelist 148 can be created according to user-based activity, such as user behavior and user activity. In accordance with an exemplary embodiment, an access manager can store a user's decision to whitelist a URL and build a list of allowed URLs for the particular user (e.g. user-level whitelist). The LDAP 146 can store a user-level whitelist 148.

The access manager 140 may use different techniques to determine when an end URL is to be added to the whitelist of end URLs. In certain embodiments, the access manager 140 can use a list of configurable events (e.g., new application registration, user initiated login request, etc.) to determine if the application's end URL is to be added to the whitelist of end URLs. The list of configurable events can be created by, for example, an administrator. For example, in the embodiment depicted in FIG. 1, the logout request handler 142 can include a machine-based activity determiner 143 that is configured to listen for such events and update the whitelist of end URLs as needed.

Various different events may trigger the addition of an end URL to the whitelist of end URLs. Examples of such events include, registration of a new application, a user initiated login request with an application URL, user instruction to add a URL to the whitelist of end URLs, and the like. For example, when a new application is getting registered with the access manager 140, the application may trigger a configuration change notification event that is detected by the machine-based activity determiner 143 of the logout request handler 142 and the machine-based activity determiner 143 of the logout request handler 142 can determine one or more end URLs associated with the newly added application and update the whitelist of end URLs to include in the determined end URLs. The end URL can be provided as part of the application registration process. Further, there can be one end URL for a particular application.

Therefore, the access manager can add new end URLs to a whitelist when it discovers the new end URL. The URLs added to the whitelist are validated URLs. A whitelist created and maintained in this manner can be applicable to the various applications protected by the access manager 140 and the users of those applications. The system-level whitelist 147 can be stored in a memory 145, such as a configstore.

In certain embodiments, when a custom login page is added to the system (e.g., a new application that is added to access manager), the custom login page can trigger a configuration change notification event and the machine-based activity determiner 143 of the logout request handler 142 will detect the one or more end URLs and update the system-level whitelist. For example, when a user has initiated a login request with an application URL, that application end URL can be added to the system-level whitelist stored in storage 145. The configuration regarding the custom login page can be saved in a configuration repository. A change to the configuration repository can trigger the configuration change notification event.

Figure 6:
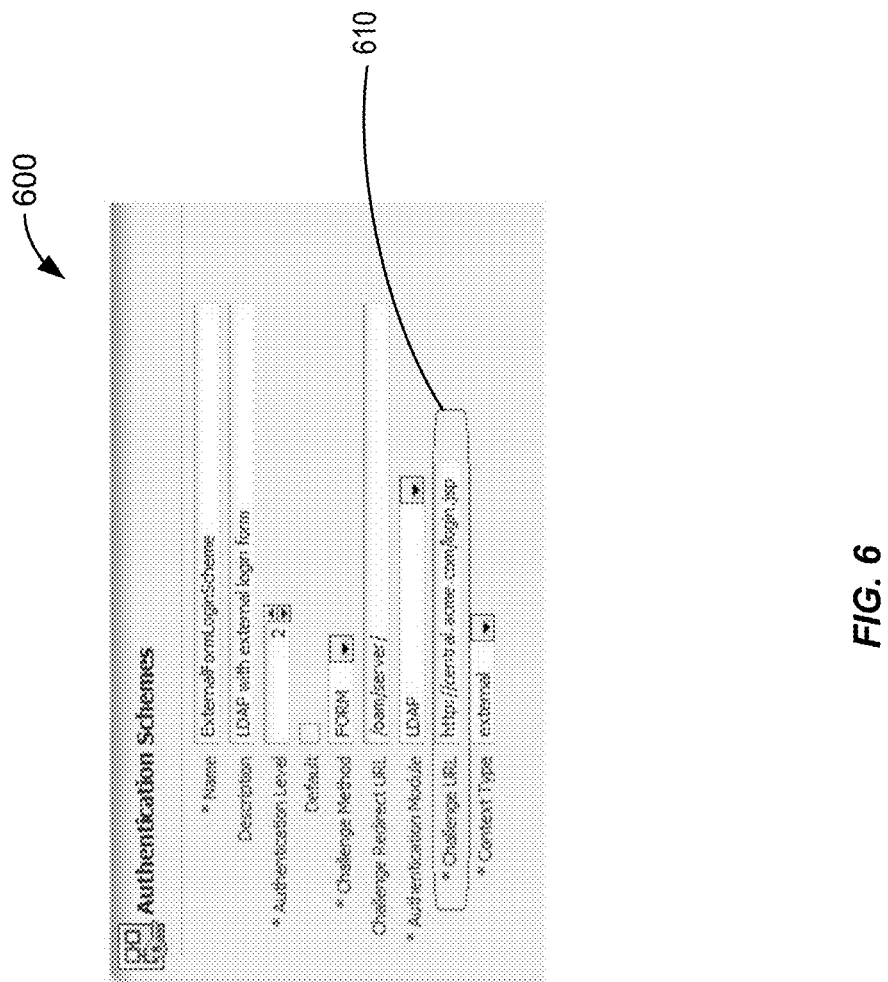
FIG. 6 illustrates an example of adding a custom login page, in accordance with an embodiment.

FIG. 6 illustrates an example of a custom login page 600, in accordance with an embodiment. As shown in FIG. 6, an out of the box access manager such as Oracle® Access Manger (OAM) can provide a single sign-on (SSO) login page or form 600 for collecting a user's credentials. A user may want to customize the single sign-on login form. For example, a user may want to tailor the single sign-on login form to match authentication requirements of a particular customer. Therefore, the user can create a new authentication scheme in accordance with the user's authentication policy by providing a challenge URL 610, which points to a custom login page. The custom login page can be added to the whitelist so that a client application can send a logout request with a same endURL parameter. In the example shown in FIG. 6, the challenge URL itself can be treated as the end URL. As an additional example, if a user is at the URL "http://<host>:<port>/app.html" when the user triggers a logout from this page, the user will be directed to a login page. In this example, the login page can be the end URL.

Therefore, the machine-based activity determiner 143 of logout request handler 142 uses machine learning to determine what end URL's should be added to a whitelist. The end URL's can be application specific and/or can be generic and applicable to all of a list of applications manage by, for example, an access manager server. The whitelist of end URL's can be access manager specific and can apply to the entire system. The machine-based activity determiner 143 can store whitelisted end URLs in storage 145.

The events described above are merely examples and various other events can also be added to this list of triggers in order to add an application end URL to the system level whitelist. Specifically, other events that are encountered can be monitored in order to determine whether an end URL should be added to a whitelist. In this manner, an administrator does not have to manually update the whitelist every time a new application is registered.

The access manager 140 can also use user actions to determine if an application end URL is to be added to the whitelist of end URLs. In certain embodiments, for example, the embodiment depicted in FIG. 1, the logout request handler 142 can include a user-based activity determiner 144 that is configured to create and maintain a user-specific whitelist of end URLs based upon user activity. As one example, the user-based activity determiner 144 may determine a user's decisions with respect to end URLs in order to create and/or update a whitelist, such as a user-level whitelist or a user-specific whitelist.

In creating a user-level whitelist, at every logout in which there is an un-validated end URL or a URL that is not on the user-level whitelist, the user may be directed to a logout consent page. At the logout consent page, the user can be explicitly asked to approve redirection to an end URL that is specified with the logout. That is, a user may be asked to approve redirected to an end URL identified by the logout consent page. A whitelist created in this manner can be applicable for a particular user and therefore this user-level whitelist is stored at the user level in storage 146. Only the user whose actions are used to create the whitelist can access information that is stored in storage 146.

Storage 146 can be a directory server such as, for example, a Lightweight Directory Access Protocol (LDAP) server. The LDAP server can also be used to store the user's credentials (e.g., user name and password).

An administrator or approved user can edit the whitelists stored in the storage 145 and storage 146. Further, access to the whitelists stored in storage 145 and 146 can be configured according to particular criteria or rules. Also, although a single whitelist is described as being stored in storage 145 and storage 146, one or more whitelists can be stored in each of storage 145 and storage 146.

Creating Whitelist

Figure 2:
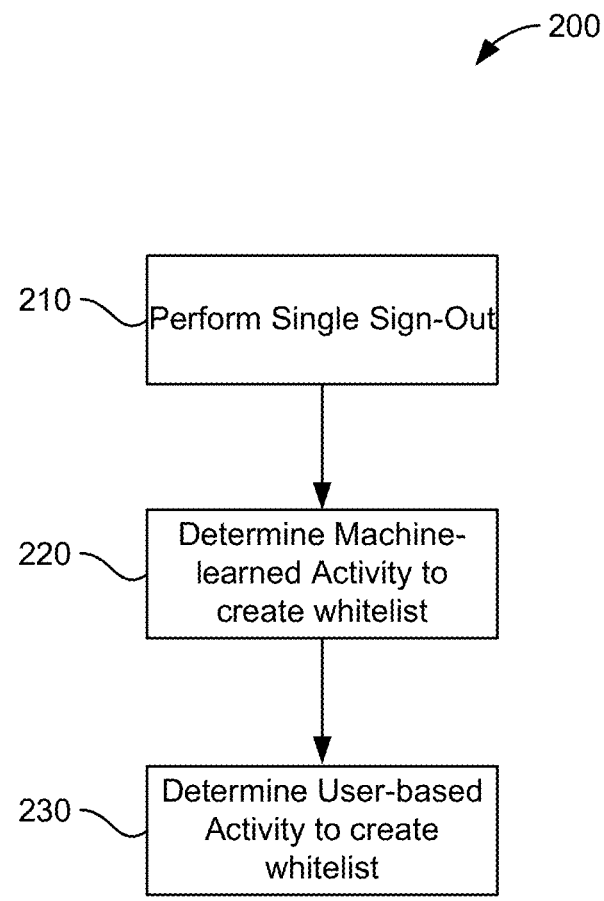
FIG. 2 illustrates a flowchart for creating a whitelist, in accordance with an embodiment.

FIG. 2 illustrates a flowchart of a method 200 for creating a whitelist, in accordance with an embodiment. At step 210, a single sign-out is performed, at step 220 a whitelist can be created according to machine-learned activity and at step 230, a whitelist can be created according to user-based activity. Although machine-learned activity and user-based activity are both illustrated for creating whitelists, only one of machine-learned activity or user-based activity may be used to create a whitelist.

As shown in FIG. 2, at step 210, a single sign-out is performed. An access manager, such as access manager 140, may implement single sign-on and single-sign off. The single sign-on/sign-out authenticator 141 can enable a user to sign-off from a single sign-on session. When the user, such as user 110, initiates logout from an application, the user may be provided with a redirection to an end URL.

Figure 3:
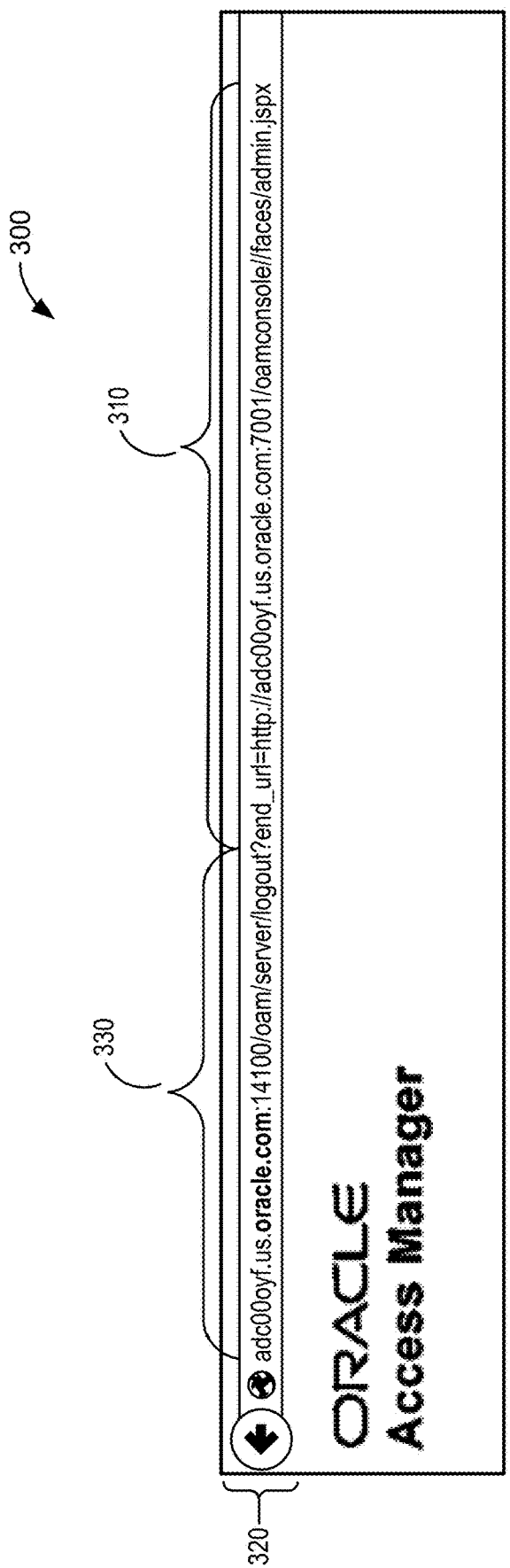
FIG. 3 illustrates a user interface indicating an end uniform resource locator (URL) for redirection, in accordance with an embodiment.

FIG. 3 illustrates a user interface 300 indicating an end URL for redirection, in accordance with an embodiment. As shown in FIG. 3, an end URL 310 can be appended to a logout URL 330 and displayed in the address bar 320. During a single sign-out, an application can append an end URL 310 to a logout URL 330. For example, a combination of a logout URL and an end URL can be "adc00oyf.us.oracle.com:14100/oam/server/logout?end_url=http://adc00oyf.us.oracle.com:7001/oam-console//faces/admin.jspx" or "http://OAMhost:port/oam/server/logout/end_url=http://www.abc.com." The combination of the logout URL 330 and the end URL 310 can also be referred to as a redirection URL. The illustration of an end URL as shown in FIG. 3 is merely an example and an end URL can be identified in different ways.

A same end URL can be propagated or transmitted to a logout consent page where a user can confirm or cancel the logout action. If the user confirms the logout, a determination can performed as to whether the end URL should be added to the whitelist. If the end URL is not whitelisted then the user can be redirected to a default logout page provided by the access manager. To ensure that the user is redirected to the end URL provided by the application, the end URL can be added to the list of end URLs to which redirection is allowed. Since the end URL is based on a user action, the end URL can be stored at the user-level, such as in storage 146.

Figure 4:
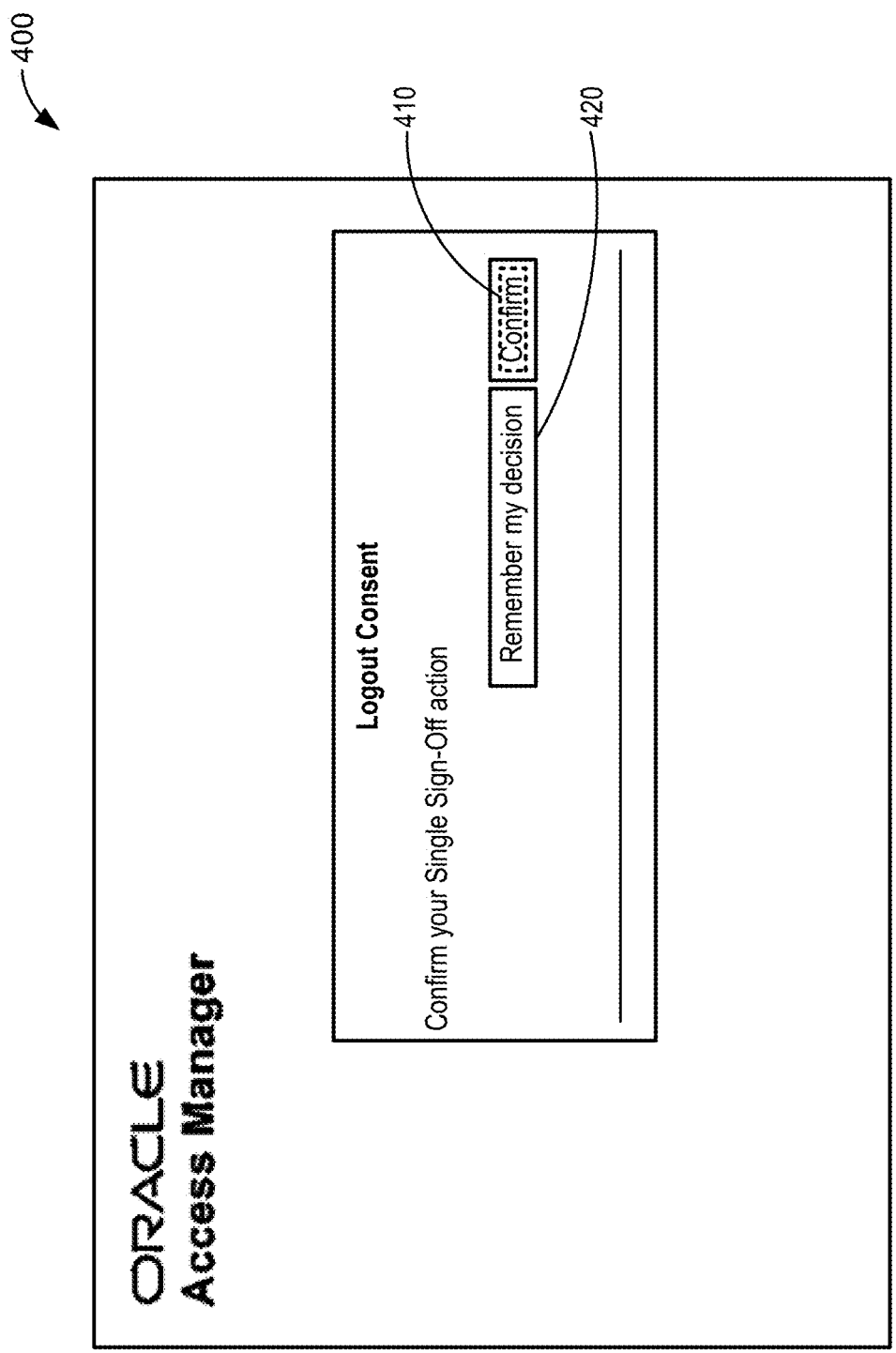
FIG. 4 illustrates a user interface for performing single sign-out (SSO), in accordance with an embodiment.

FIG. 4 illustrates a user interface 400 for performing single sign-out (SSO), in accordance with an embodiment. As shown in FIG. 4, a user can be requested to confirm their single sign-out action by selecting the confirm button 410. The user can also select the "Remember my decision" button 420, which can be used to remember the user's response to the single-sign out action. When the user selects the remember my decision button 420, the end URL can be added to the whitelist of URL's.

Although a single screen is shown in FIG. 4, one or more screens can be used to prompt a user to perform a logout and add a URL to a whitelist according to the user decision. Further, if an end URL is already an approved URL, then a user may not be prompted to select the remember my decision button 420.

Before redirecting the user to the end URL, the access manager can determine if the end URL is a valid URL to which redirection can be performed. If the end URL is on a whitelist (e.g. system-level whitelist or user-level whitelist) as a valid URL, then the user can be directed to the end URL. If the end URL is not on a whitelist, then the access manager can determine whether the end URL should be added to a whitelist. The access manager can check the system-level whitelist and/or the user-level whitelist according to the event or activity.

At step 220, a system-level whitelist can be created and/or modified (e.g., additions, deletions, etc.) using machine-learning performed by the machine-based activity determiner 143. At step 230, a user-level whitelist can be created and/or modified (e.g., additions, deletions, etc.) that is specific to a user according to the user's activity. Step 220 and step 230 are explained in greater detail below.

Machine Learning to Add End URL to Whitelist

As described above, in certain embodiments, a whitelist of end URLs may be created and managed using automated machine-learning techniques. According to one such technique, access manager 140 may be configured to listen and monitor certain pre-configured events to determine if an application end URL can be added to a whitelist maintained by access manager 140. Examples of such pre-configured events include events related to registering a new application, initiating a login request (e.g., initiating login for an application) and other events. The events may be configured by an administrator of access manager 140.

A logout request handler 142 may can be configured to listen and monitor the configured events. For example, when a new application is being registered with the access manager 140, it may trigger a configuration change notification event that is received by logout request handler 142, which may then determine the URL of newly added application and then add that end URL to the whitelist of end URLs (e.g., system-level whitelist) maintained by the access manager 140.

End URLs can also be added or registered to a whitelist during integration. Integration occurs when a product is combined with other products. For example, one or more products can be added to operate with the access manager. Integration with another product can be a configured event that the access manager listens to. For example, if the access manager determine that certain products, such as adaptive access manager, enterprise manager, etc., are authorized, then any end URLs that the access manager encounters during the integration with such products can be added to the whitelist. When the access manager is integrated with another product, all of the end URLs encountered by the access manager through this integration can be automatically added to the whitelist. When the access manager encounters any of these URL's during registration or integration, the URLs can be added to the whitelist (e.g. system-level whitelist).

In certain embodiments, whenever a custom login page for an application is added to the system, the addition of the custom login page can trigger a configuration change notification event and the listener (e.g., logout request handler 142) will pick up the end URL and update the whitelist (e.g. system-level whitelist). The access manager can add new end URLs to the whitelist as it discovers the new end URLs. By implementing machine learning, the logout request handler can build the whitelist by listening to various events. That is, based upon learned data (e.g., the end URLs that were previously added to a whitelist), additional end URLs can be added to the whitelist. The whitelist of end URLs that is created by machine learning can be stored at, for example, the system level (e.g., at configstore) and can therefore be applicable to all users in the system.

FIG. 7 illustrates an example of a system-level whitelist, in accordance with an embodiment. Specifically, FIG. 7 shows a screenshot 700 including end URL's 710 that have been whitelisted at the system level. FIG. 7 provides an example of a whitelist configuration. In FIG. 7, "EBS," "lcomart" and "sic" are examples of application identifiers and the value of these elements are the actual white-listed URLs. These URLs were added as a result of various actions by a configuration notification listener.

Therefore, the URLs corresponding to the events, can be automatically included in the whitelist of URLs and the application can redirect the user to the whitelisted end URLs.

Learning from User's Action to Add End URL to Whitelist

As described above with respect to FIG. 2, a whitelist can be created and managed based upon user-based activity, such as user behavior. In certain embodiments, an access manager may monitor certain user activities and add (or delete) end URLs from a whitelist of end URLs based upon the user activities. In accordance with an exemplary embodiment, an access manager can monitor a user's activity indicative of the user's approval for an end URL and automatically add the user-approved end URL to the whitelist. In this manner, the access manager may store and maintain user-specific whitelists (user-level whitelists) of end URLs, where a user-level whitelist of end URLs for a user includes one or more end URLs that have been approved by that user. Further, end URLs can be removed from the whitelist by the access manager. The access manager can provide a user interface for managing whitelist URLs which can include the addition and/or removal of the URLs.

In the logout consent page, for every un-validated end URL or end URL that is not currently on a whitelist, the user can be explicitly asked to approve redirection to the end URL that is specified with the logout. The consent page can have, for example, a stepped up authentication, such as one-time password (OTP) based second factor authentication, to ensure that the decision to whitelist the URL is made by a genuine user. The logout request handler can store the whitelisted URLs in the Lightweight Directory Access Protocol (LDAP) server. The whitelist URLs that are created based on user activity are specific to user. The access manager will also provide a self-service capability to edit whitelist URLs specific to a user.

Figure 8:
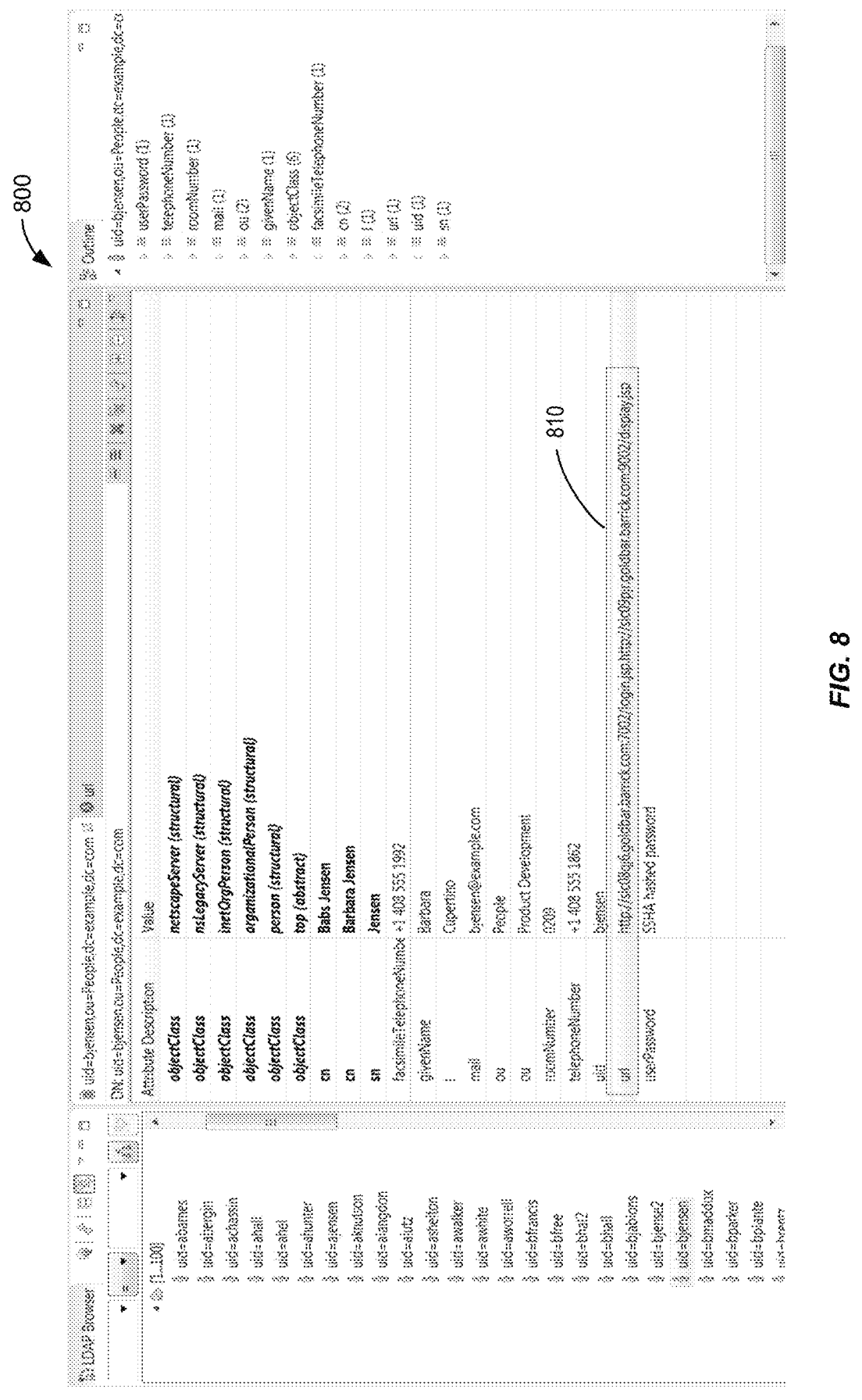

FIG. 8 illustrates an example of a user-level whitelist 800, in accordance with an embodiment. As shown in FIG. 8, a particular URL's can be whitelisted for a particular user.

FIG. 8 illustrates an end URL "http://slc08qj6.goldbar.barrick.com;7002/ogin.jsp,httl:slc09pjr.goldbar.barrick.com:9002/display.jsp" that has been whitelisted for a user corresponding to the user ID "bjensen." In this example, "slc08qj6.goldbar.barrick.com" is the host, "7002" is the port and "login.jsp" is the actual resource. "Login.jsp" is the end URL and "display.jsp" is the redirection URL.

When a user subsequently logs in, the access manager will query the LDAP server and the user specific whitelist URLs will be cached along with the system level whitelist URLs for the validation of the end URLs. Logout request handler will validate the end URL with this cache and allow redirection if the end URL is whitelisted.

The access manager can provide the capability to save the user's decision and subsequent logouts with the same end URL will not require explicit approval. An access manager can also provide a self-service capability to edit the whitelist specific to a user. Therefore, the access manager can progressively learn which URLs should be whitelisted.

Although adding a whitelist through machine learning and user activity is described, an administrator or approved user can modify a whitelist, either system-level or user-level whitelist. That is, an administrator or approved user can additionally add or remove end URLs to/from a whitelist. For example, if a particular end URL has not had a corresponding event or if no user decision has been made with respect to a particular end URL, then an administrator or approved can add an end URL to the whitelist. However, the number of end URLs added and maintained by an administrator can be greatly decreased, according to the exemplary embodiments.

In an alternative embodiment, if an end URL is not added to a whitelist, then a list of non-whitelisted end URLs or restricted end URLs can also be created. For example, the list of restricted end URLs can be created according to, for example, machine learning and user action using the techniques described above. A non-whitelisted or restricted URL can be a URL where the access manager forces a check to ensure that the URL is protected before redirecting to the URL.

Performing Redirection

Figure 5:
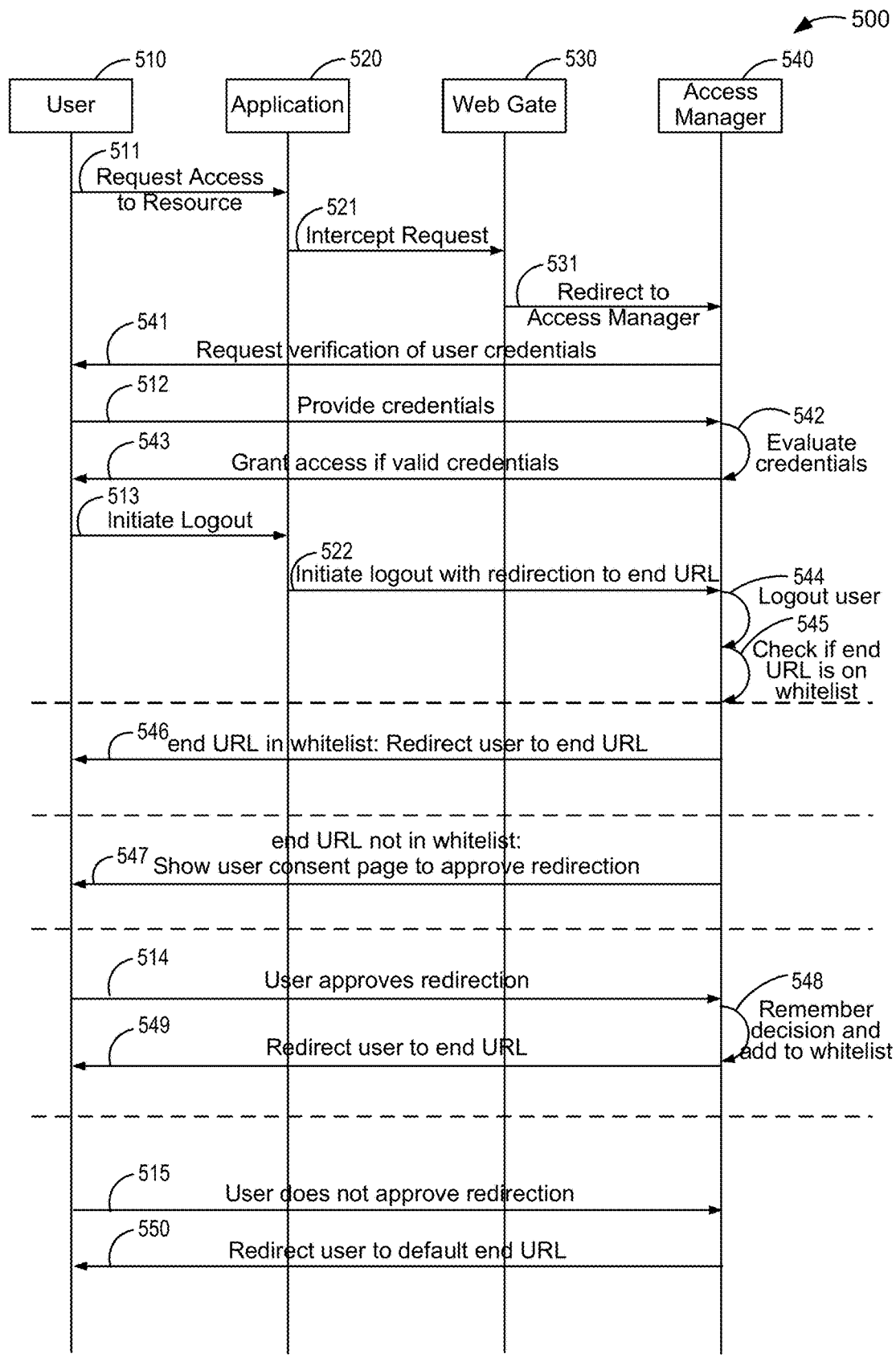
FIG. 5 illustrates a sequence diagram for performing redirection of a uniform resource locator (URL), in accordance with an embodiment.

FIG. 5 illustrates a sequence diagram for performing redirection using an end uniform resource locator (URL), in accordance with an embodiment.

The sequence 500 can be performed by various actors and entities, for example, by a user 510, an application 520, a web gate 530 and an access manager 540. The user 510, application 520, a web gate 530 and an access manager 540 can correspond to, for example, the user 110, application 120, web gate 130 and access manager 140, respectively, depicted in FIG. 1 and described above.

At step 511, the user 510 can request access to a particular application from application 520. The application 520 can be, for example, an expense report application, a finance application, a human resources application, etc. The application 520 can be an application that is a client of the access manager 540 or protected by the access manager 540.

At step 521, the request to access application 520 is intercepted by the web gate 530 and, at step 531, the web gate 530 redirects the request to the access manager 540. The web gate 530 can be a web-server plug-in for the access manager 540 that can direct URL requests to the access manager 540 for authentication and authorization.

After receiving the request to access the application, at step 541, the access manager 540 can request verification of the user's credentials. As part of step 541, the access manager 540 may present the user 510 with a request for authentication credentials in the form of a challenge (e.g., via the user's web browser at client device). At step 512, the user 510 may provide the user's credentials (e.g., user name and password) to the access manager 540. At step 542, the access manager 540 can evaluate the user's credentials and determine if the user has provided the appropriate authentication and if the user is authorized to access the application.

At step 543, if the user's credentials are successfully validated, the user can be granted access to the application 520. For example, the user requesting access to an expense report application may be allowed access to the expense report application. In certain embodiments, access to the application may be provided by setting up an authenticated session between the user and the application.

The user may then access and use the application 520. At some later time point (e.g., after the user is done using the application 520), the user may decide to log out of the application. At step 513, the user 510 may initiate a logout. In response, at step 522, the application 520 may send an initiate logout request and provide redirection to an end URL request to the access manager 540.

At step 544, the access manager 540 can log the user out. In certain embodiments, this may be done by removing the authenticated session that was set up when the user was authenticated in 542 and a session setup in 543.

After the logout is complete, the user may be redirected to an end URL, which may be provided by the application. The end URL may be, for example, a home page for application 520, or some other location. For example, as shown in FIG. 3, in certain embodiments, the user interface 300 of the access manager 540 can display a logout URL 330 and an associated an end URL 310 in the address bar 320. As shown in FIG. 3, in some embodiments, the end URL 310 may be provided as a query parameter to the logout URL. The logout URL triggers an end of a single sign-on session.

Since the user has logged out and is therefore no longer in an authenticated session, the redirection URL provided by the application may not be a protected URL. That is, the user is no longer in a secure session. For example, the redirection URL provided may be a URL pointing to a phishing website or a malicious website. Conventionally, the user was redirected to the location pointed to by the redirection or end URL without any checking or protection. In certain embodiments disclosed herein, before the user proceeds to the website (or other location) corresponding to the redirection URL, the access manager 540 can determine whether the redirection URL is on a whitelist of validated end URLs. The determination as to whether the redirection URL is on a whitelist of validated URLs can be performed immediately after logout.

At step 545, the access manager 540 checks whether the end URL to which the user is to be redirected is on a whitelist of end URLs available to the access manager 540. In certain embodiment, the logout request handler 142 of the access manager can statically load a whitelist (e.g., system-level whitelist and/or user-level whitelist) and check, during runtime, whether the end URL to which the user is about to be redirected is on the whitelist. By statically loading, the access manager can load the URLs from the storage during bootstrapping (e.g., a process that can proceed without external input).

There can be different outcomes from the check performed in step 545. At step 546, if it is determined that the end URL is on the whitelist, then the access manager 140 540 may redirected the user to location (web page) corresponding to the end URL, and processing ends. At step 547, the access manager 540 may determine that the end URL is not on the whitelist and, in response, the access manager 540 may seek the user's approval for being redirected per the end URL. For example, the access manager 540 may display a user consent page to the user asking the user to approve redirection to the end URL. If, at step 514, the user approves the redirection, then at step 548, the user can be redirected per the end URL.

In certain embodiments, at 548, the access manager 540 may remember and store the user's approval decision. Since the user has approved the redirection for that particular end URL, the end URL may be added by the access manager 540 to a whitelist (e.g., user-level whitelist) maintained by access manager 540. In this manner, the access manager 140 automatically keeps track of end URLs approved by users of various applications and stores these users-approved end URLs in one or more whitelists maintained by the access manager 540.

FIG. 4 depicts an example consent page 400 that may be displayed to a user in 547. Page 400 has a user selectable option 410 that allows a user to confirm and provide approval for the redirection and another user-selectable option 420 that enables the user to direct access manager 540 to remember and store information regarding the user approval. If option 420 is selected, then access manager 540 adds the end URL to a whitelist as an user approved end URL. The redirection URL shown to the user can be, for example, the redirection URL shown in FIG. 3.

After 546, if the access manager 540 determines at 515 that the user 510 does not approve the redirection to the end URL, then at 550, the access manager 540 may redirect the user 510 to a default end URL. In certain embodiments, different applications may have different default end URLs (e.g., the default end URLs can be application-specific). In some embodiments, a default end URL may be configured for the access manager 540 and may be applicable for multiple applications protected by access manager 540.

In the example in FIG. 5 and described above, an end URL is added to a whitelist based upon the user action at 514. An end URL can also be added to the whitelist by machine learning according to events encountered by the access manager.

Computer System

Figure 9:
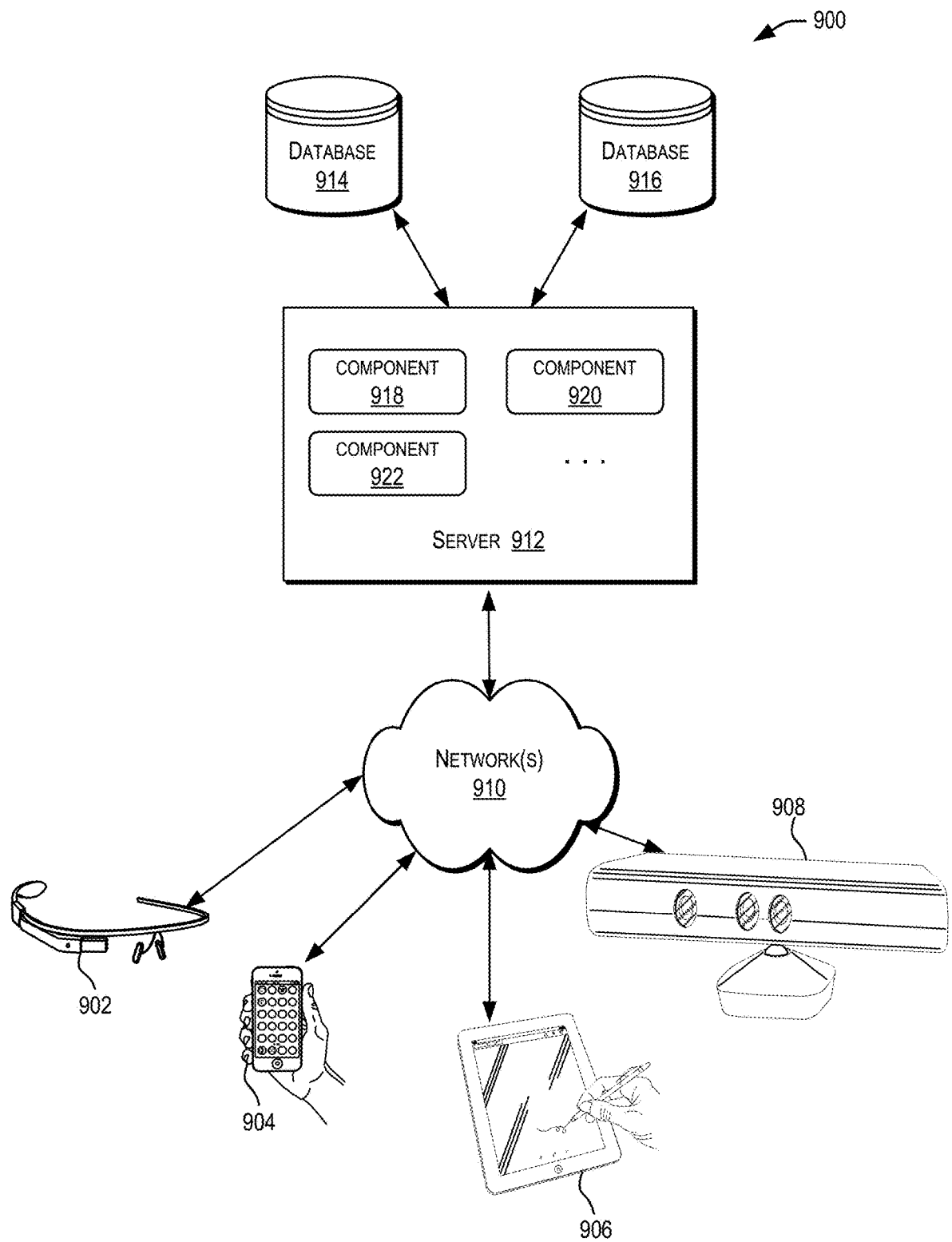
FIG. 9 depicts a simplified diagram of a distributed system for implementing an embodiment.

FIG. 9 depicts a simplified diagram of a distributed system 900 for implementing an embodiment. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide message delivery services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as inventory information, and other information used by certain embodiments. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle®, that are adapted to store, update, and retrieve data in response to SQL-formatted commands.

Figure 10:
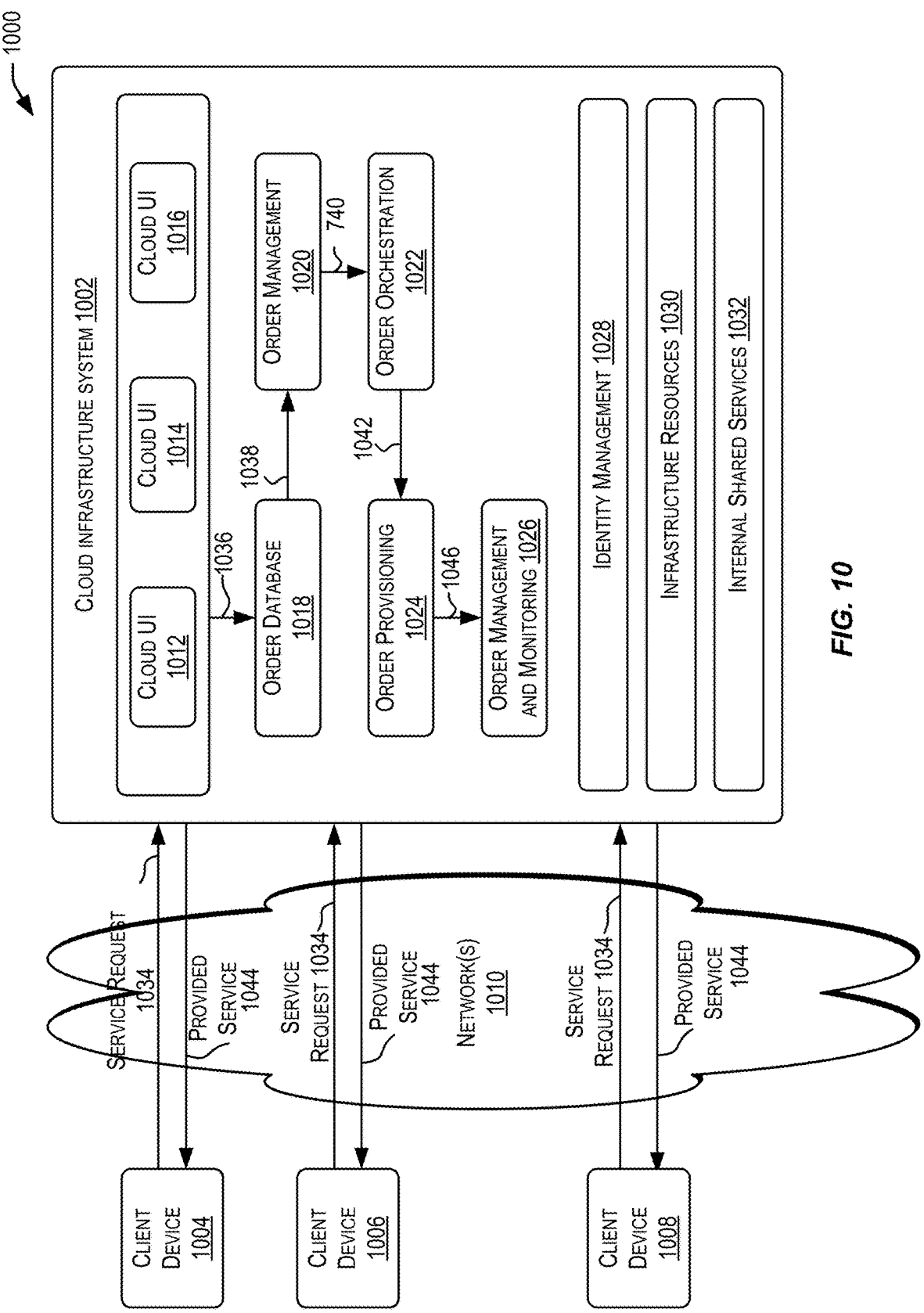
FIG. 10 illustrates a simplified block diagram of one or more components of a system environment in which services may be offered as cloud services, in accordance with an embodiment.

In some embodiments, the message delivery services described above may be offered as services via a cloud environment. FIG. 10 illustrates a simplified block diagram of one or more components of a system environment in which services may be offered as cloud services, in accordance with an embodiment.

In the illustrated embodiment in FIG. 10, system environment 1000 includes one or more client computing devices 1004, 1006, and 1008 that may be used by users to interact with a cloud infrastructure system 1002 that provides cloud services, including services for dynamically modifying documents (e.g., webpages) responsive to usage patterns. Cloud infrastructure system 1002 may include one or more computers and/or servers that may include those described above for server 912.

It should be appreciated that cloud infrastructure system 1002 depicted in FIG. 10 may have other components than those depicted. Further, the embodiment shown in FIG. 10 is only one example of a cloud infrastructure system. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908. Client computing devices 1004, 1006, and 1008 may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

In certain embodiments, services provided by cloud infrastructure system 1002 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle®) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle® Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At 1038, the order information may be forwarded to an order management module 1020 that may be configured to perform billing and accounting functions related to the order, such as verifying the order, and upon verification, booking the order.

At 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1024 to be isolated from implementation details, such as whether or not services and resources are actually provisioned on the fly or pre-provisioned and only allocated/assigned upon request.

At 1044, once the services and resources are provisioned, a notification may be sent to the subscribing customers indicating that the requested service is now ready for use. In some instance, information (e.g. a link) may be sent to the customer that enables the customer to start using the requested services.

At 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
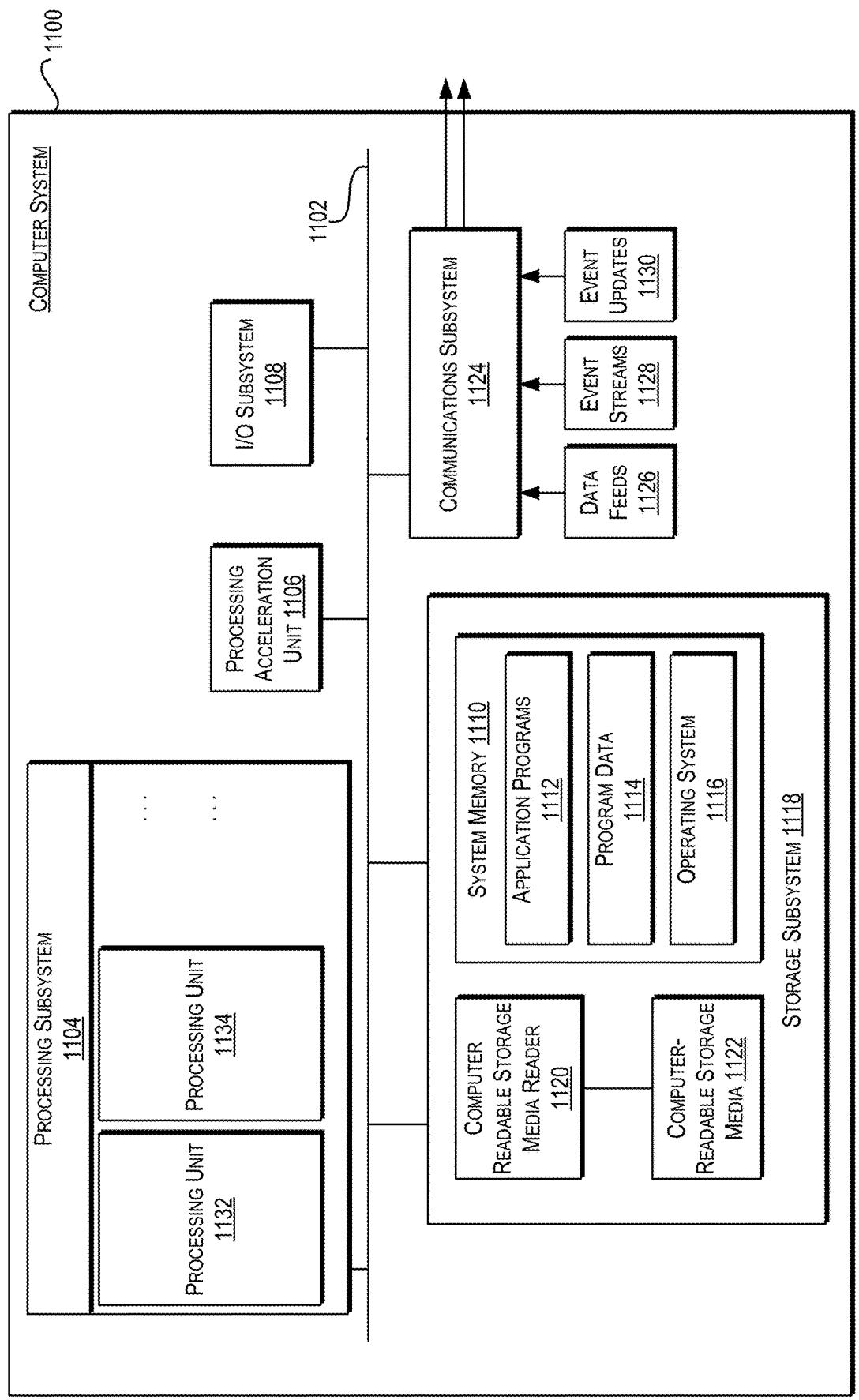
FIG. 11 illustrates an exemplary computer system that may be used to implement certain elements, according to some exemplary embodiments.

FIG. 11 illustrates an exemplary computer system that may be used to implement certain elements, according to some exemplary embodiments. In some embodiments, computer system 1100 may be used to implement any of the various servers and computer systems described above. As shown in FIG. 11, computer system 1100 includes various subsystems including a processing subsystem 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may include one or more processing units 1132, 1134, etc. A processing unit may include be one or more processors, including single core or multi-core processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122.

In various embodiments, the processing units can execute a variety of programs or code instructions and can maintain multiple concurrently executing programs or processes. At any given time, some or all of the program code to be executed can be resident in system memory 1110 and/or on computer-readable storage media 1110 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with certain embodiments.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the present disclosure. Embodiments are not restricted to operation within certain specific data processing environments, but are free to operate within a plurality of data processing environments. Additionally, although certain embodiments have been described using a particular series of transactions and steps, it should be apparent to those skilled in the art that the present disclosure is not limited to the described series of transactions and steps. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
constructing, by an access manager of an access management system executing an access manager application, a whitelist of valid redirection addresses, wherein the whitelist is constructed based on redirection addresses that are approved by a user during a prior logout from the application or based on preapproved logout redirection addresses;
receiving, by the access manager, a request to log out the user from the application executing on a device;
determining, by the access manager, a redirection address for redirecting the user after logging out from the application, wherein the redirection address comprises a Uniform Resource Locator (URL) to which the user is redirected after log out from the application, wherein the URL comprises a logout Uniform Resource Locator (URL) and an end URL associated with the application of the access management system;
validating, by the access manager, the redirection address, wherein the validating the redirection address comprises determining whether the redirection address is on the constructed whitelist of valid redirection addresses to which the user can be redirected after logging out from the application; and
based on the validation, causing, by the access manager, the application to perform one of redirecting the user to the redirection address and determining whether to add the redirection address to the whitelist of valid redirection addresses.

2. The method according to claim 1, wherein the application redirects the user to the redirection address in response to the redirection address being on the whitelist of valid redirection addresses.

3. The method according to claim 2, wherein the whitelist of valid redirection addresses comprises one or more approved redirection addresses.

4. The method according to claim 2, wherein the whitelist of valid redirection addresses comprises one of a machine-learned address based on learned previous activity and a user-based address that is based on a user activity.

5. The method according to claim 1, wherein the determining the addition of the redirection address to the whitelist of valid redirection addresses comprises:
determining that the redirection address corresponds to a predetermined event; and
in response to the determining that the redirection address corresponds to the predetermined event, adding the redirection address to the whitelist of valid redirection addresses.

6. The method according to claim 5, wherein the predetermined event comprises one of application registration during which the application is registered with the access management system, product integration during which one or more products are added to operate with the access management system, and log-in page addition in which a new log-in page for the application is added.

7. The method according to claim 1, wherein the determining the addition of the redirection address to the whitelist of valid redirection addresses comprises:
determining that the redirection address corresponds to a predetermined user action; and in response to the determining that the redirection address corresponds to the predetermined user action, adding the redirection address to the whitelist of valid redirected addresses.

8. The method according to claim 7, wherein the predetermined user action comprises user confirmation of the redirection address.

9. The method according to claim 1, wherein the whitelist of valid redirection addresses comprises at least one of a system-level list that applies to users of the access management system and a user-level list that applies to particular users of the access management system.

10. The method according to claim 9, wherein the system-level list comprises end URLs that are applicable to all access management system users.

11. The method according to claim 9, wherein the user-level list comprises one or more end URLs that are applicable to a particular access management system user.

12. The method according to claim 1, wherein the redirection address comprises a logout Uniform Resource Locator (URL) and an end URL.

13. A non-transitory computer-readable storage medium storing a plurality of instructions executable by one or more processors to cause the one or more processors to perform operations, comprising:
constructing, by an access manager of an access management system executing an access manager application, a whitelist of valid redirection addresses, wherein the whitelist is constructed based on redirection addresses that are approved by a user during a prior logout from the application or based on preapproved logout redirection addresses;
receiving, by the access manager, a request to log out the user from the application executing on a device;
determining, by the access manager, a redirection address for redirecting the user after logging out from the application, wherein the redirection address comprises a Uniform Resource Locator (URL) to which the user is redirected after log out from the application, wherein the URL comprises a logout Uniform Resource Locator (URL) and an end URL associated with the application of the access management system;
validating, by the access manager, the redirection address, wherein the validating the redirection address comprises determining whether the redirection address is on the constructed whitelist of valid redirection addresses to which the user can be redirected after logging out from the application; and
based on the validation, causing, by the access manager, the application to perform one of redirecting the user to the redirection address, and determining addition of the redirection address to a list of valid redirection addresses.

14. The non-transitory computer-readable storage medium according to claim 13, wherein the application redirects the user to the redirection address in response to the redirection address being on the whitelist of valid redirection addresses.

15. The non-transitory computer-readable storage medium according to claim 14, wherein the whitelist of valid redirection addresses comprises one or more approved redirection addresses.

16. The non-transitory computer readable medium according to claim 14, wherein the whitelist of valid redirection addresses comprises one of a machine-learned address based on learned previous activity and a user-based address that is based on a user activity.

17. An access management system comprising:
a memory; and
one or more processors coupled to the memory and configured to:
construct, by an access manager of the access management system executing an access manager application, a whitelist of valid redirection addresses, wherein the whitelist is constructed based on redirection addresses that are approved by a user during a prior logout from the application or based on preapproved logout redirection addresses;
receive, by the access manager, a request to log out the user from the application executing on a device;
determine, by the access manager, a redirection address for redirecting the user after logging out from the application, wherein the redirection address comprises a Uniform Resource Locator (URL) to which the user is redirected after log out from the application, wherein the URL comprises a logout Uniform Resource Locator (URL) and an end URL associated with the application of the access management system;
validate, by the access manager, the redirection address, wherein the validating the redirection address comprises determining whether the redirection address is on the constructed whitelist of valid redirection addresses to which the user can be redirected after logging out from the application; and
based on the validation, cause, by the access manager, the application to perform one of redirecting the user to the redirection address, and determining addition of the redirection address to the whitelist of valid redirection addresses.

18. The system according to claim 17, wherein the application redirects the user to the redirection address in response to the redirection address being on the whitelist of valid redirection addresses.

19. The system according to claim 17, wherein the whitelist of valid redirection addresses comprises at least one of a system-level list that applies to users of the access management system and a user-level list that applies to particular users of the access management system.

* * * * *